Figure 7:
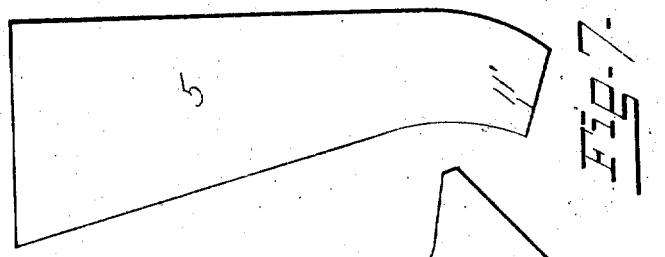

J. E. RICHARDS.

UNION SUIT.

APPLICATION FILED OCT. 1, 1909.

Reissued Nov. 23, 1909.

13,046.

2 SHEETS—SHEET 1.

Inventor
JAMES E. RICHARDS

Witnesses:
M. Sibler
C. M. Theobald.

By R. J. McCarty
his Attorney.

J. E. RICHARDS.

UNION SUIT.

APPLICATION FILED OCT. 1, 1909.

Reissued Nov. 23, 1909. 13,046.

2 SHEETS—SHEET 2.

Inventor
JAMES E. RICHARDS.

Witnesses
M. Sieber
C. M. Theobald.

By R. J. McCarty
his Attorney

UNITED STATES PATENT OFFICE.

JAMES E. RICHARDS, OF DAYTON, OHIO, ASSIGNOR TO DAYTON CLOTHING MANUFACTURING COMPANY, A FIRM.

UNION SUIT.

13,046. Specification of Reissued Letters Patent. Reissued Nov. 23, 1909.

Original No. 899,187, dated September 22, 1908, Serial No. 435,950. Application for reissue filed October 1, 1909. Serial No. 520,595.

*To all whom it may concern:*

Be it known that I, JAMES E. RICHARDS, a citizen of the United States, residing at Dayton, in the county of Montgomery and State of Ohio, have invented certain new and useful Improvements in Union Suits; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to new and useful improvements in union suits or under garments, and comprises certain improvements of the union suit shown and described in Letters Patent No. 887,346, granted to myself May 12, 1908.

The present improvements comprise means for more effectually maintaining the crotch pocket or overlapped portion of the crotch closed while the garment is on the person of the wearer, thereby eliminating any possibility of the crotch pocket opening and permitting the outer garment to come in contact with the person of the wearer with its attending annoyance.

Besides the foregoing object, a further object of the invention is to provide means for preventing any sagging or hanging of the garment at the front of the crotch; in other words, to provide means which enable the garment at the crotch to fit with a degree of snugness which prevents the pocket in the crotch from either sagging at the front of the garment, or binding the person at the crotch.

These results, to-wit—the maintaining of the crotch pocket closed while the garment is on the wearer, and preventing the overlapped flaps of the crotch from sagging or gathering in the front of the garment, are brought about by uniting the front of the garment on each side of the opening to two straight strips which form the hem on each side of the front of the garment. These straight strips are united to the curved edges of the garment in the front of the leg portions and owing to such straight and curved portions being united in the front of the garment adjacent to the crotch, a natural pocket effect is created which joins the pocket in the crotch formed by the overlapping crotch flaps. Owing to these straight and curved edges or portions being united, the straight portions or strips being naturally shorter than the curved edges to which they are united are drawn inwardly at the crotch by the curved portions of the legs, and thus given a permanent inward turn at the crotch.

Preceding a more detailed description of the invention, reference is made to the accompanying drawings, of which—

Figure 6:
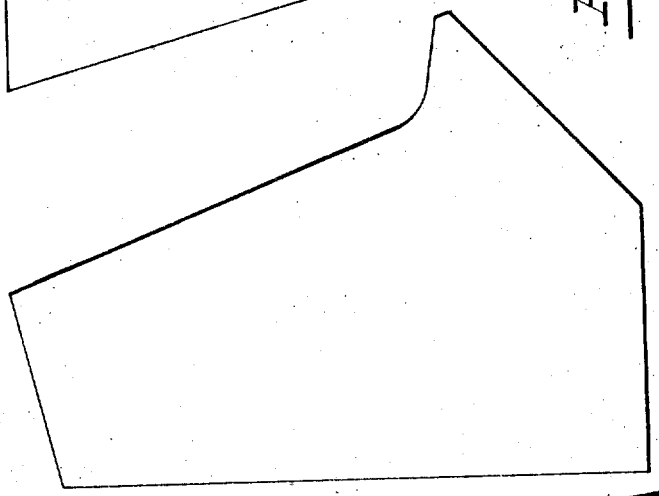
Figure 1:
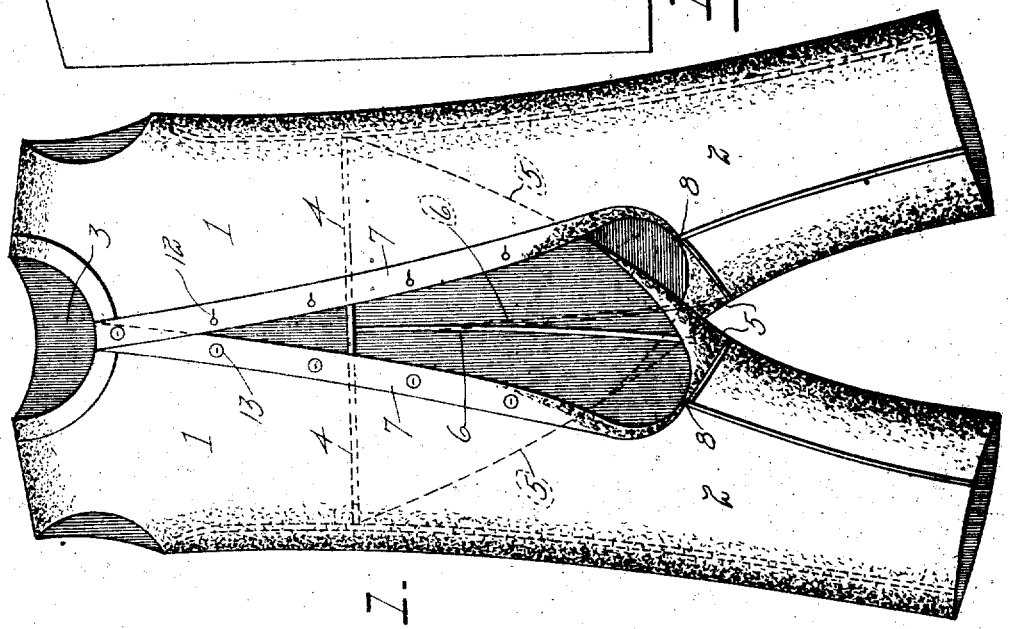
Figures 2, 3, 4, 5:
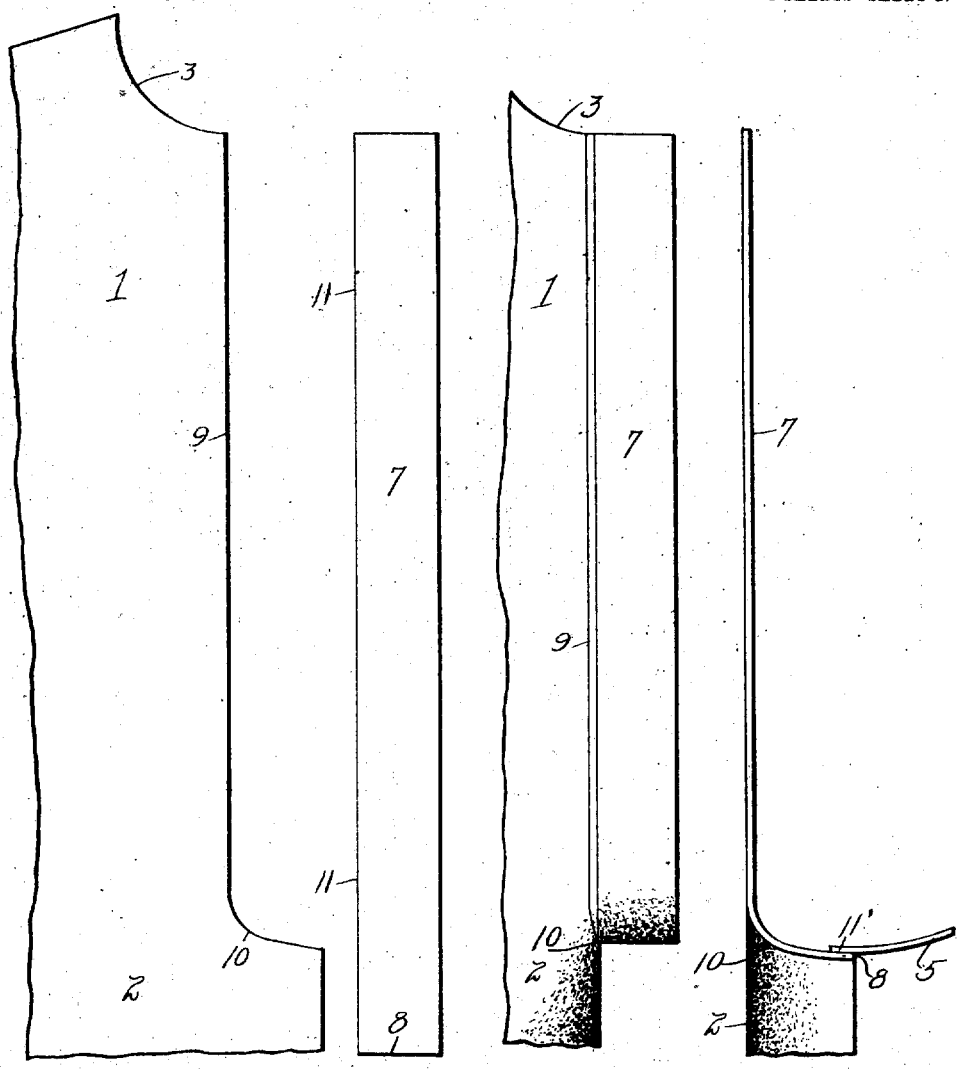

Figure 1, is a front elevation of a union suit made in accordance with my improvements, the same being shown with the front thrown open to illustrate the features involved in the improvements. Fig. 2, is a detail view of a portion of the front of the garment on one side of the opening showing the straight edge joining a curved edge at the upper portion of a leg immediately at the front of the crotch. Fig. 3, is a detail view of one of the straight strips forming the hem of the front of the garment on each side of the opening. Figs. 4 and 5, show the parts shown in Figs. 2 and 3 united. Fig. 6, represents a pattern of the pants leg portion. Fig. 7, is a pattern of one of the crotch flaps.

In a detail description of the invention, similar reference characters indicate corresponding parts.

The patterns shown in Figs. 6 and 7, as well as the garment shown in Fig. 1, minus the features shown in Figs. 2, 3, 4 and 5, are common to the garment as it is shown and described in my former patent. The body portion 1 and the leg portions 2 of the garment, may be made of either knit or woven fabric. In the front of the garment the body and leg portions are of one continuous piece on each side extending from the neck opening 3 to the lower ends of the legs. The garment in the back has a cross seam 4 which unites the rear leg portions 2 to the body portion at the back. The crotch flaps 5 are united at their upper horizontal edges one over the other along the back seam 4. Along the inner edges of said crotch flaps 5 they are united to the body and leg portions along the seams 6, and the lower ends of said crotch flaps 5 are carried upward in the front of the garment, overlapping each other, and are united to the lower ends 8 of the straight seam strips 7.

In the front of the garment the body and leg portions 1 and 2 have joining straight and curved edges 9 and 10. To these straight edges and curved edges 9 and 10, the straight edge 11 of the seam strip 7 is united by a seam, and owing to the straight and curved edges being thus united, the lower end or portion of the strip 7 on each side of the opening in the front of the garment, is given an inward curve at the crotch which forms a natural pocket effect and serves to maintain the pocket flaps of the crotch in their closed or overlapped positions at all times when the garment is on the person of the wearer.

In Figs. 4 and 5, the seam strip 7 is shown united to the straight and curved edges 9 and 10 of the body and legs of the garment, and it is there clearly illustrated how the uniting of these two edges causes the seam strip 7 to take an inward curve in the front of the crotch where it joins the front or lower ends 11′ of the crotch flaps 5. In Fig. 5, the seam which unites the front or lower end of one of the crotch flaps to the lower end 8 of the seam strip 7, is shown at 11, and it will be there seen that the curved end of the seam strip 7 which is due to its being united to the curved edge 10 of the body portion and leg portion of the garment, unites with the crotch flaps in providing the crotch pocket formed by the overlapping of the two crotch flaps made in accordance with the pattern shown in Fig. 7 and united to the garment in the manner hereinbefore set forth. The seam strips 7 are provided with eyelets 12 and buttons 13 by means of which the front of the garment is closed.

I claim:

As a new article of manufacture, a union suit comprising pants and body portions, and two crotch flaps united at their upper edges to the back portion of the garment by a transverse seam, and to the body and leg portions of the garment by longitudinal seams, said flap portions overlapping each other and forming a pocket in the crotch of the garment, two straight front seam strips united to the front of the body and pants portions of the garment along the straight and curved edges of said body and pants portions, the portions of said straight seam strips which are united to the curved edges of the garment being extended to join the lower ends of the crotch flaps and adapted to coöperate with the crotch flaps in forming the crotch pocket, said crotch pocket being maintained in a closed position owing to the straight seam strips being united at their lower ends to the curved edges of the pants portions of the garment, substantially as described.

In testimony whereof, I affix my signature in the presence of two witnesses.

JAMES E. RICHARDS.

Witnesses:
MATTHEW SIEBLER,
R. J. MCCARTY.